United States Patent [19]

Olschewski et al.

[11] 4,267,920
[45] May 19, 1981

[54] CONVEYOR BELT ROLL

[75] Inventors: Armin Olschewski, Schweinfurt; Manfred Brandenstein, Eussenheim; Lothar Walter, Schweinfurt; Horst M. Ernst, Eltingshausen; Heinrich Kunkel, Schweinfurt; Leonard Halliger, Schweinfurt; Robert Stolz, Schweinfurt; Rainer Schürger, Schwanfeld, all of Fed. Rep. of Germany

[73] Assignee: SKF Kugellagerfabriken GmbH, Schweinfurt, Fed. Rep. of Germany

[21] Appl. No.: 52,796

[22] Filed: Jun. 28, 1979

[30] Foreign Application Priority Data

Jul. 1, 1978 [DE] Fed. Rep. of Germany ... 7819856[U]

[51] Int. Cl.³ .............................................. B65G 39/09
[52] U.S. Cl. ..................................... 198/842; 193/37; 308/20
[58] Field of Search ........................... 198/842; 193/37; 308/20, 187.1, 190; 29/116 R

[56] References Cited

U.S. PATENT DOCUMENTS

| 1,993,519 | 3/1935 | Miltenberger | 308/20 |
| 2,009,281 | 7/1935 | Stein | 308/187.1 X |
| 2,702,868 | 2/1955 | Kindig | 308/20 |
| 2,750,238 | 6/1956 | Black | 308/187.1 |
| 2,763,158 | 9/1956 | Firth | 198/842 X |

FOREIGN PATENT DOCUMENTS

| 469952 | 11/1972 | Australia | 198/842 |
| 1035428 | 7/1958 | Fed. Rep. of Germany | 308/20 |
| 592632 | 5/1959 | Italy | 308/20 |

Primary Examiner—James L. Rowland
Attorney, Agent, or Firm—Eugene E. Renz, Jr.

[57] ABSTRACT

A conveyor belt roll assembly comprising a roll casing, a roll end mounted at opposite axial ends of the roll casing and a rolling bearing with a first bearing ring supported in the roll end and a second bearing ring secured in an axial direction by means of a ring member connected to the shaft. The roll end has a radially outwardly directed flange with corrugations at its outer edge extending in a peripheral direction and the ring member axially securing the bearing on the shaft is arranged outside of the bearing. The conveyor belt roll assembly further includes a radially outwardly directed disc fastened to the shaft and forming a radial sealing slot with the axial outer face of the roll end.

12 Claims, 5 Drawing Figures

4,267,920

CONVEYOR BELT ROLL

BACKGROUND OF THE INVENTION

The present invention relates to a conveyor belt roll assembly and specifically to one comprising a roll casing, a roll end made of sheet metal mounted in each end of the roll casing, each roll end supporting a rolling bearing with at least one bearing ring made of sheet metal in the bore of the roll casing and a shaft, the other bearing ring for the rolling bearing being secured in an axial direction by means of a ring member connected to the shaft.

Conveyor belt rolls generally of the type described above are known wherein the roll end and at least one of the bearing rings are made of relatively thin walled sheet metal. In these known assemblies the sheet metal bearing ring is usually constructed as a spherical shell shaped recess of the roll end. An assembly of this type is illustrated in German Patent DE-Gbm No. 1 992 970.

Conveyor belt rolls are also known which include a bearing ring made of thin walled sheet metal having a radial flange formed integrally therewith which forms the roll end and by which the bearing is secured in the bore of the roll casing. German Patent DE-AS No. 1 273 916 and DE-Gbm No. 7 334 209 show arrangements of this type wherein the bearing ring carries the outer race of the rolling elements and German Patent No. DE-Gbm No. 7 731 602 shows an assembly wherein the bearing ring carries the inner race of the rolling elements.

In these prior known constructions, the roll end or the flange of the bearing which forms the roll end is formed in a flat manner and acts as a diaphragm which has a comparatively low rigidity. The roll end in these constructions is connected with the roll casing by means of a welded seam. This welded seam is relatively long and thus requires a considerable amount of welding material and in addition a relatively long and complicated welding procedure. In order to axially secure the roll casing in relation to the shaft, a snap ring is usually used which seats in an annular groove located in the inside area of the roll. This construction presents certain disadvantages. For example, the groove weakens the shaft and furthermore it is located in an inaccessible, difficult to reach location. Furthermore, these known arrangements have practically no sealing ability at all which means the inside bearing space is not protected as well as it should be to prevent escape of lubricant and ingress of foreign matter which can cause deterioration or failure of the bearing especially in dust and dirt-laden environments.

To combat this condition, it is previously known to provide special seals in front of the bearing such as labyrinth seals. These seals, however, increase the axial length on the one hand and complicate the assembly process by reason of the separate parts required.

SUMMARY OF THE PRESENT INVENTION

The present invention provides a solution to the above problems and meets the objectives of providing a conveyor belt roll which has rigidly supported and effectively sealed bearings and wherein the bearings themselves consist of simple, easy to make parts having a relatively small axial construction width, form a transportable unit with the sealing and fastening elements and are connected in a simple way with other parts of the conveyor belt roll.

The construction of the conveyor belt roll assembly of the present invention provides the following advantages:
  (a) The bearing mounting is sufficiently rigid;
  (b) The bearing is optimally sealed and has nevertheless a small axial construction width; and
  (c) The bearing is connected in a simple way with other parts to the conveyor belt roll without high material expense.

More specifically, the unique design of the roll end provides the rigidity of the bearing mounting. The particularly good sealing characteristic is attained by the novel design of the roll end or the bearing itself by the additionally provided cover plate and as the case may be by the seals additionally provided in sealing slots. As a result of the special ring arrangement providing the axial fastening of the bearing on the shaft, an expensive fastening of the roll end in the roll casing can be obviated. This ring for the axial mounting of the bearings on the shaft forms a transportable unit with the other bearing parts so that transport as well as assembly is made easier and more economical.

BRIEF DESCRIPTION OF THE DRAWINGS

These and other objects of the present invention and various features and details of the operation and construction thereof, are hereinafter more fully set forth with reference to the accompanying drawings, wherein.

DETAILED DESCRIPTION OF THE EMBODIMENTS

Figure 1:
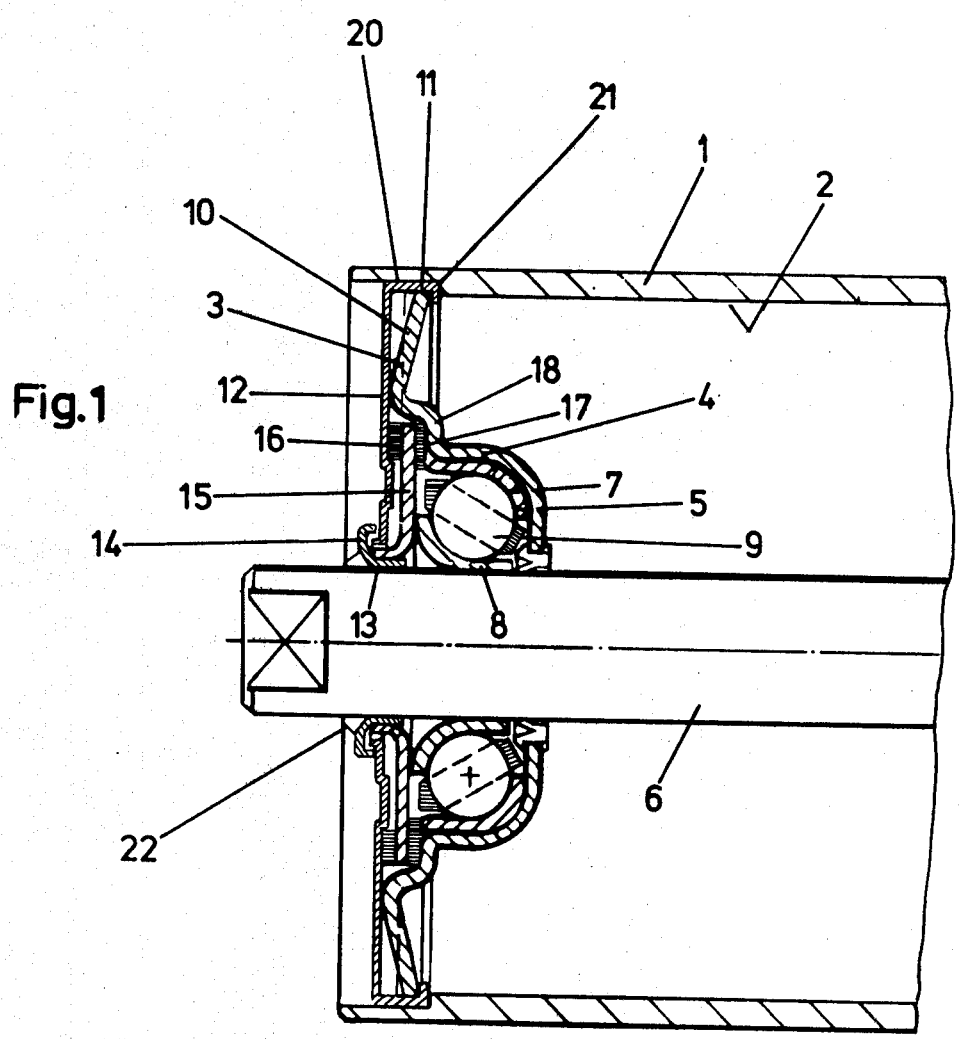
FIG. 1 is a fragmentary transverse sectional view of a conveyor belt roll used for example in mining operations.
Figure 2:
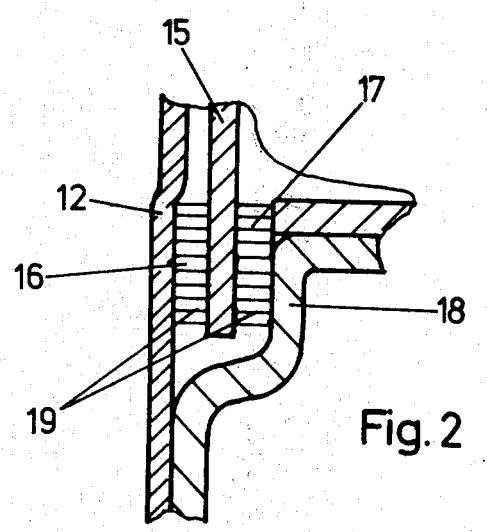
FIG. 2 is an enlarged fragmentary sectional view of the seal area of the assembly shown in FIG. 1.

Referring now to the drawings and particularly to FIG. 1 thereof, there is illustrated a conveyor belt roll assembly constructed in accordance with the present invention. The assembly comprises a roll casing 1 having a bore 2 and a roll end 3 made of sheet metal fitted in the bore at opposite axial ends of the roll casing. (Only one roll end is shown in the drawing.) The roll end 3 mounts in its bore, an offset cartridge-shaped projection 4 which serves to accommodate a rolling bearing 5 to support the roll casing 1 on a shaft 6. Each rolling bearing 5 consists of an outer ring 7 defining the outer race, an inner ring 8 defining the inner race and a complement of balls 9 in the annular space between the rings which are guided by a cage. In the present instance the inner and outer rings 7 and 8 are made of sheet metal and have a generally L-shaped cross section. The roll end 3 has a radially outwardly directed flange with a series of corrugations or undulations on the outer periphery extending in a peripheral direction. These corrugations provide a reinforcing of the flange 10 as well as a wider support base for fastening the roll end 3 in the bore of the roll casing 1. A cover plate 12 is fastened to the outside edge of the flange 10 of the roll end 3 which extends radially inwardly in close proximity to the shaft 6. An angle-shaped ring 13 which has an outwardly directed flange 14 and a disc 15 which also extends radially outwardly are arranged on the shaft for fastening the bearing. As illustrated, the flange 14 and the disc 15 form an annular groove into which the free end of the cover plate 12 fits. In this manner the parts of the bearing as well as the fastening ring 13 and disc 15 are held together as an integral, transportable unit. The annular slots 16 and 17 between the cover plate 12 and the opposing faces of the disc 15 and the confronting face of the offset 18 of the roll end are closed in this manner with a seal provided by relatively short, essentially axially directed flocked fibers 19. These fibers are applied on the opposing faces of the disc 15 and have their outer free ends lightly engaging the face of the offset 18 of the roll end and against the face of the cover plate 12 to form the seal.

During assembly of the conveyor belt roll, the subassembly or unit consisting of the bearing rings 7 and 8, the complement of rolling elements 9, the roll end 3, the cover plate 12, the ring 13 and the disc 15 is slipped onto the shaft and into recess 20 of the bore 2 of the roller casing until the roll end 3 abuts shoulder 21 of the recess 20. The bearings inserted in this fashion at opposite axial ends are then each welded by means of a welding connection 22 between the ring 13 and the shaft 6. This welding seam 22 is essentially shorter than the otherwise normal welds in the area of the bore 2 of the roll casing 1.

Figure 3A:
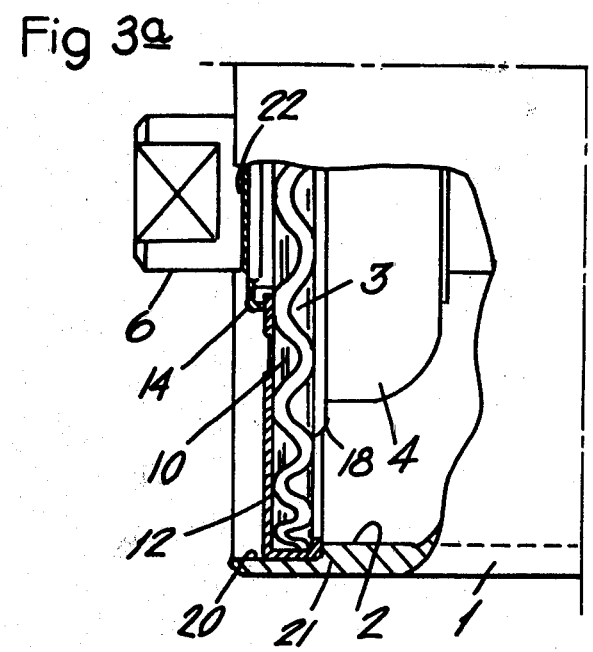
FIG. 3a is a fragmentary side elevational view with parts broken away to show the configuration of the roll end.
Figure 3:
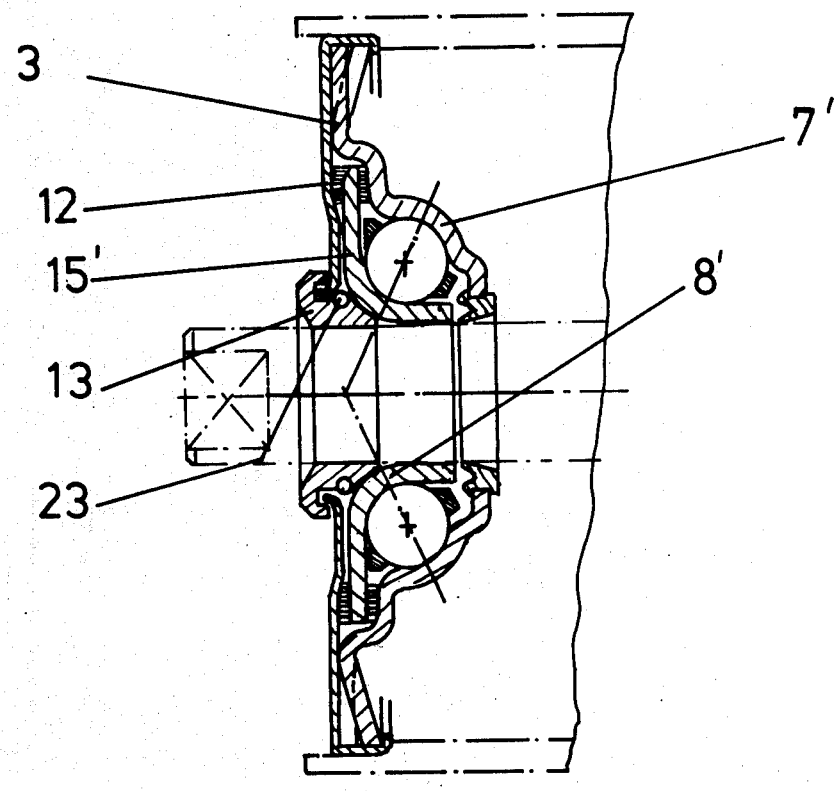
FIG. 3 is a view similar to FIG. 1 showing a modified embodiment of conveyor belt roll in accordance with the present invention.

There is illustrated in FIG. 3 a modified version of the roll assembly described above. In this instance, the roll end 3 is made in one piece with the outer ring 7' of the rolling bearing 5 and the inner ring 8' is also made in one piece with the disc 15'. In order to connect the ring 13 which is used for axial securing of the bearing and which is in this instance made of solid material with the other parts for transport, that is, for the installation of the bearing, a snap ring 23 is placed on this ring which engages behind the cover plate 12. In other respects, the design of this embodiment essentially corresponds to that shown in FIG. 1.

Figure 3B:
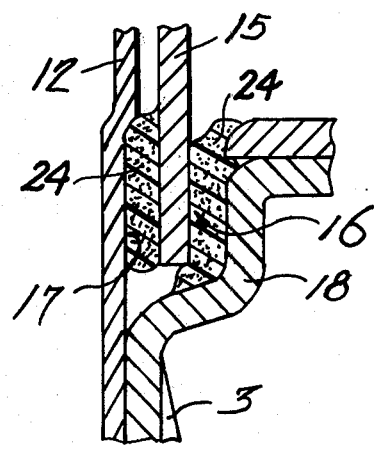
FIG. 3b is an enlarged fragmentary sectional view similar to FIG. 2 showing an alternate seal arrangement.

Even though specific embodiments of roll assemblies have been illustrated and described herein, it is not intended to limit the invention and changes and modifications may be made therein within the scope of the claims attached hereto. For example, instead of the flocked fibers directly applied to the disc 15, discs can be inserted in the sealing slots 16, 17 which are coated with such flocked fibers or for example, with felt or non-woven discs. It is also possible within the scope of the present invention to introduce a plastic mass filled with oil in the sealing slots and adjacent annular spaces which then hardens and forms an oil soaked plastic sponge (see FIG. 3b). In cases where the contamination danger is not so great, only one seal may be used which is appropriately placed in the outer sealing slot 16.

What is claimed is:

1. A conveyor belt roll assembly comprising a roll casing, a roll end mounted in at least one end of the roll casing, a rolling bearing including a plurality of rolling elements and at least one bearing ring, a shaft, a ring member connected to the shaft and supporting the rolling elements between said bearing ring and roll end, said roll end and bearing ring being made of sheet metal, said roll end having a radially outwardly directed flange having corrugations extending continuously at its outer edge in a peripheral direction, said ring member axially securing the bearing on the shaft being arranged outside of the bearing, a radially outwardly directed disc mounted on the shaft and forming a radial sealing slot with the outer axial face of the roll end and a cover plate extending radially inwardly to a point adjacent said ring member for axially securing the bearing on the shaft arranged on the roll end and forming with said disc a radial sealing slot and seal means mounted in the sealing slot between the opposing faces of said cover plate and disc and in the sealing slot between said roll end and said disc.

2. A conveyor belt roll as claimed in claim 1 wherein the inner peripheral edge of the cover plate engages in an annular groove in said ring member for axially securing the bearing on the shaft.

3. A conveyor belt roll as claimed in claim 1 wherein said seal is formed by essentially axially directed, a relatively short flocked fibers applied to one of the two opposing faces of said cover plate the free ends engaging the opposite face.

4. A conveyor belt roll as claimed in claim 1 wherein said seal comprises an oil soaked plastic sponge in said sealing slot.

5. A conveyor belt roll assembly comprising a roll casing, a roll end mounted in at least one end of the roll casing, a rolling bearing with a first bearing ring supported in said roll end, a shaft, a second bearing ring for the bearing secured in an axial direction by means of a ring member connected to the shaft, said roll end and bearing rings being made of sheet metal, said roll end having a radially outwardly directed flange having corrugations extending continuously at its outer edge in a peripheral direction, said ring member axially securing the bearing on the shaft being arranged outside of the bearing, a radially outwardly directed disc mounted on the shaft and forming a radial sealing slot with the outer axial face of the roll end and a cover plate extending radially inwardly to a point adjacent said ring member for axially securing the bearing on the shaft arranged on the roll end and forming with said disc a radial sealing slot and seal means mounted in the sealing slot between the opposing faces of said cover plate and disc and in the sealing slot between said roll end and said disc.

6. A conveyor belt roll in accordance with claim 5 wherein said first bearing ring is made in one piece with the roll end.

7. A conveyor belt roll as claimed in claim 5 wherein the disc is made in one piece with said second bearing ring.

8. A conveyor belt roll as claimed in claim 5 wherein said disc is supported on said ring member for axially securing the bearing on the shaft.

9. A conveyor belt roll as claimed in claim 5 wherein the disc is formed integrally with said ring member for axially securing the bearing on the shaft.

10. A conveyor belt roll as claimed in claim 5 wherein said ring member is connected with the shaft by means of welding.

11. A conveyor belt roll assembly comprising a roll casing, a roll end mounted in at least one end of the roll casing, a rolling bearing with a first bearing ring supported in said roll end, a shaft, a second bearing ring for the bearing secured in an axial direction by means of a ring member connected to the shaft, said roll end having a radially outwardly directed flange having corrugations at its outer edge extending in a peripheral direction, said ring member axially securing the bearing on the shaft being arranged outside of the bearing, a radially outwardly directed disc mounted on the shaft and forming a radial sealing slot with the outer axial face of the roll end and a cover plate extending radially inwardly to a point adjacent said ring member for axially securing the bearing on the shaft arranged on the roll end and forming with said disc a radial sealing slot, the inner peripheral edge of said cover plate engaging in an annular groove in said ring member for axially securing the bearing on the shaft.

12. A conveyor belt roll assembly comprising a roll casing, a roll end mounted in at least one end of the roll casing, a rolling bearing including a plurality of rolling elements and at least one bearing ring supported in said roll end, a shaft, a ring member connected to the shaft and securing the bearing ring in an axial direction, said ring member arranged outside of the bearing, said roll end having a radially outwardly directed flange haing corrugations at its outer edge extending in a peripheral direction, a radially outwardly directed disc mounted on the shaft and forming a radial sealing slot with the outer axial face of the roll end and a cover plate extending radially inwardly to a point adjacent said ring member for axially securing the bearing on the shaft and forming with said disc a radial sealing slot, the inner peripheral edge of said cover plate engaged in an annular groove in said ring member for axially securing the bearing on the shaft.

* * * * *